Patented July 17, 1923.

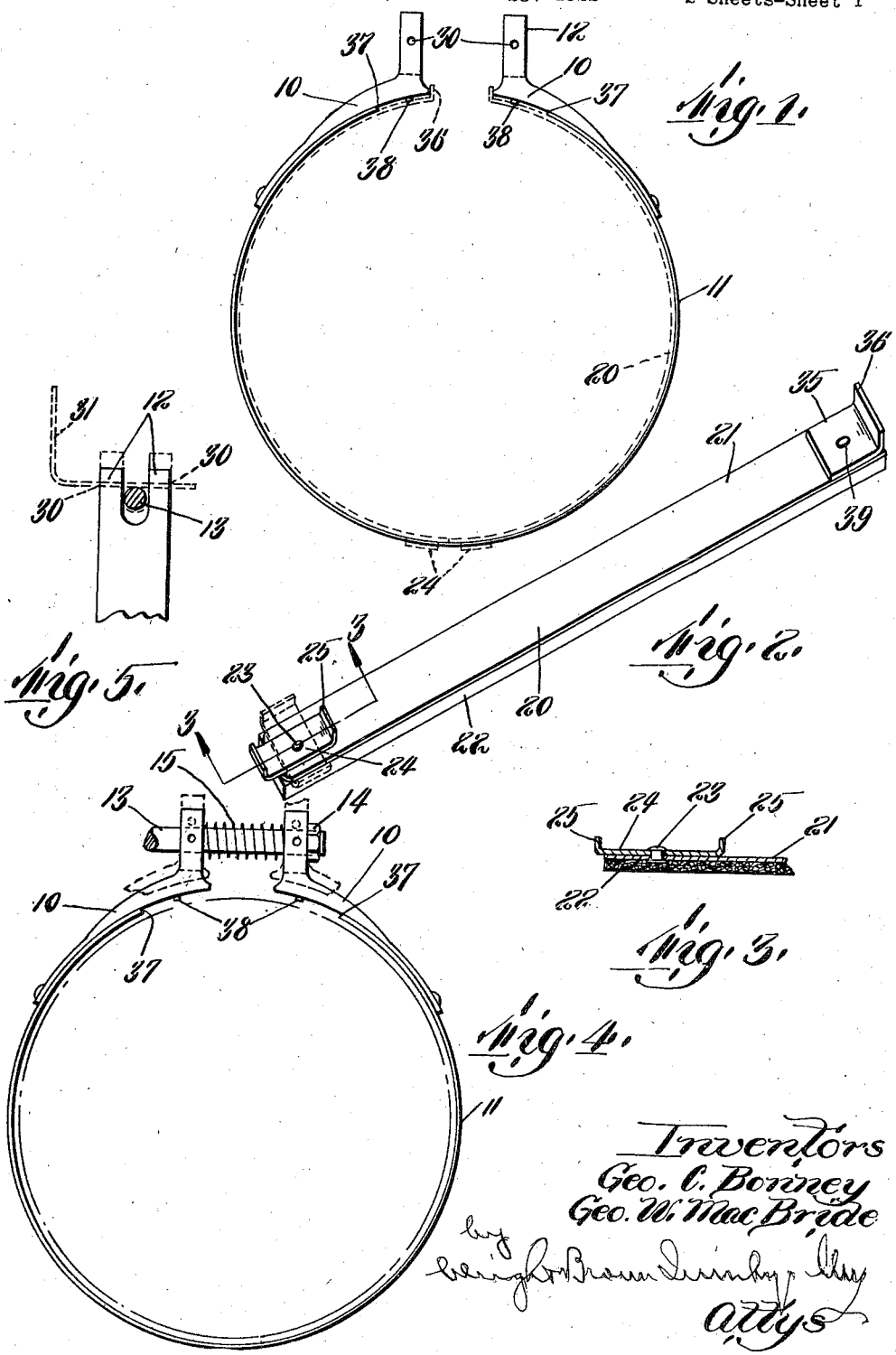

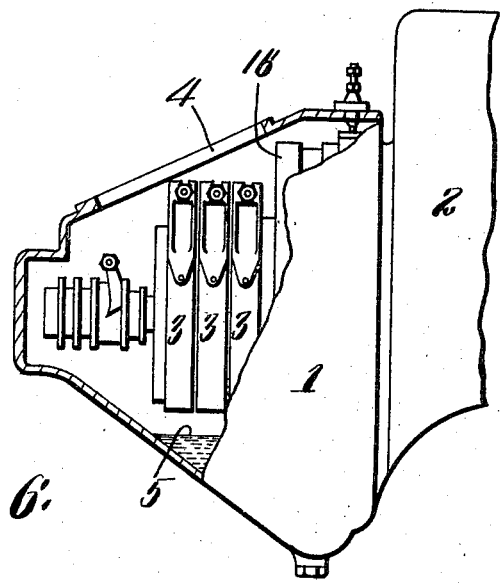
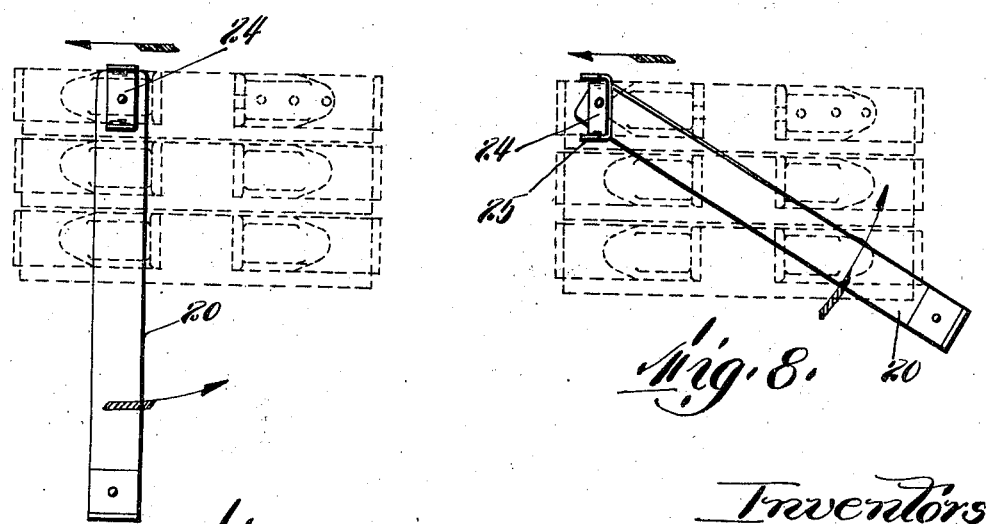

1,461,803

UNITED STATES PATENT OFFICE.

GEORGE W. MacBRIDE AND GEORGE C. BONNEY, OF BOSTON, MASSACHUSETTS, ASSIGNORS TO MacBRIDE CO., OF SOUTHPORT, MAINE, A CORPORATION OF MAINE.

BAND BRAKE.

Application filed April 28, 1922. Serial No. 557,105.

*To all whom it may concern:*

Be it known that we, GEORGE W. MACBRIDE and GEORGE C. BONNEY, both citizens of the United States, residing at Boston, in the county of Suffolk and State of Massachusetts, have invented new and useful Improvements in Band Brakes, of which the following is a specification.

This invention relates to band brakes being particularly designed for use with cars equipped with planetary transmissions. As ordinarily constructed it is a difficult matter to reline the transmission brake bands of such cars without considerable disassembling of the transmission housing, it often being found necessary, particularly, if by accident loose nuts or other small parts are dropped into the casing, to remove the entire engine starting mechanism.

The present invention provides a construction of lining and bands by which the linings may be inserted in position or removed through the opening provided in the top of the transmission casing, which is normally closed by a cover plate, without further disassembling of the parts, so that there is no danger of loose nuts and the like falling into the case, and by which the linings may be inserted or removed in an expeditious manner without special tools.

For a more complete understanding of this invention, together with further objects and advantageous details and combinations of parts, reference may be had to the accompanying drawings in which—

Figure 1 is an edge view of a band showing the position of the lining in dotted lines.

Figure 2 is a perspective of a lining section adjusted in preparation for insertion in a band.

Figure 3 is a fragmentary section on line 3—3 of Figure 2.

Figure 4 is an edge view of the band and operating mechanism, the position of the band lugs, when the band is adjusted for insertion of the lining, being shown in dotted lines.

Figure 5 is a fragmentary side elevation of a portion of the parts shown in Figure 4.

Figure 6 is a side elevation partly broken away of the transmission casing of the car.

Figures 7 and 8 are somewhat diagrammatic views illustrating the operation of inserting the lining.

Referring first to Figure 6, at 1 is shown a casing fixed to the end of the engine frame 2 in which is positioned the usual planetary transmission comprising three brake drums on each of which is positioned a brake band, as shown at 3. The casing 1 is provided with an opening 4 in its upper face which is designed normally to be covered by a cover plate (not shown). The lower portion of the casing is intended to be filled with oil, the level of which is indicated at 5 in this figure.

Each brake band 3, as shown more particularly in Figures 1 and 4, is provided at each end with an actuating lug 10 which is attached to opposite ends of a resilient hoop-shaped band 11. The lugs 10 have upwardly extending bifurcated ears through which passes an actuating rock shaft 13 on the outer end of which is threaded a nut 14. Surrounding each rock shaft 13 and bearing between the ears 12 is a coil spring 15 which normally urges the lugs apart to release the brake band. By rocking the shafts 13, however, in a manner well known in the art, the lugs 10 at the opposite end of the corresponding brake band are brought toward each other to tighten the brake on the drum. The band 11 is normally lined with a friction material, such as fabric, which is brought into contact with the corresponding drum when the band is tightened by actuation of the rock lever. These linings are subjected to wear by the brake drum and it is therefore sometimes necessary to replace them. As heretofore constructed this has been a difficult operation. It is usually necessary to remove the rock shaft 13 for which action it is necessary to remove the nut 14. While these may be removed by reaching through the opening 4 of the housing, it often happens that the nuts are accidentally dropped and lodge in the lower portion of the housing where they are inaccessible for removal through the opening 4. Other parts are also likewise liable to drop into the housing while the relining operation is being effected. The engine flywheel shown at 16 in Figure 6 is mounted to dip beneath the surface of the oil in the housing 1 and portions of the magneto also dip therebeneath. It is therefore highly important that no foreign matter, particularly of a magnetic nature, be allowed to remain loose within the casing and in case any parts have accidentally fallen within the casing, it is necessary to further disassemble it to gain access for such removal. In cars equipped with electric starters it is usually necessary to remove the starter mechanism in order to sufficiently disassemble the transmission casing.

The present invention, therefore, provides a construction of band and lining by which no removal of the rock shaft or bolts 13 is necessary and no further disassembling of the casing than the removal of the cover plate normally covering the opening 4 is required. For this purpose the lining shown in detail in Figures 2, 3, and 5 at 20, is constructed of a pair of sections arranged end to end each of which may be inserted in position through the opening 4 of the housing. Each section 20 as shown comprises a resilient strip or backing plate 21, carrying on one face frictional material of any suitable type such as fabric as shown at 22. The opposed face of the backing plate or member 20 is provided with means for engaging and interlocking with the brake band. In order that each section may be inserted in position through the opening 4 without disassembling the mechanism, provision is made by which one end of each section may be inserted into engagement with the band the section extending substantially at right angles thereto and then, while still in engagement therewith, moved partially around the inner face of the band, the opposite end of the section being pushed inwardly toward the band until the section is in lengthwise lapping engagement therewith. For this purpose one end of each lining member has pivoted or swiveled thereto by means of a rivet or other suitable means 23, a channel-shaped element 24 having outwardly directed end flanges 25 so spaced as to slidably embrace the side edges of the band 11. This channel element is swiveled so that when turned to extend lengthwise of the lining section it may be engaged with the inner face and side edges of its band the length of the section extending substantially at right angles to the band, as shown in Figure 7, the member 24 at that time engaging the band adjacent one end at or near a lug 10.

As shown in Figures 7 and 8 the lining may be inserted beneath the end of the band to which it is to be attached, as shown this being the band nearest to the flywheel which is the most difficult one to reline. To facilitate the insertion of the lining member in this position, it is preferable to provide in the bifurcated ears of each lug 10 alined perforations shown at 30 in Figures 1, 4, and 5 so positioned that a wire shown in dotted lines in Figure 5 at 31 may be passed therethrough and engage the upper portion of the rock shaft 13 to retain the end of the band in position elevated above the brake drum so as to permit ready insertion of the lining. After the lining is inserted the wire 31 is removed since it has no function except in assembling and disassembling the parts. The raised position of the lugs 10 is indicated in dotted lines in Figures 4 and 5. The end of the lining member to which the channel 24 is attached may then be moved downwardly about the transmission while the opposite end of the member may be swung inwardly, as shown by the arrows in Figure 7 toward the position indicated in Figure 8. By further sliding motion the lining member may be moved into its final position extending half way around the band. A pair of lining members are slid into position from opposite ends of the crank so that the ends of the members, having fixed thereto the channel guides 24, are adjacent, while the opposite ends of these members lie beneath the lugs 10.

In order to retain the ends of the members in position each one has fixed thereto an element 35 preferably having its end turned upwardly at 36 to engage over the inner end of the lug 10 as shown in dotted lines in Figure 1. In order to provide a suitable seat for the element 35, the band 11 may terminate back from the inner end of the lug 10 as shown at 37 (Figures 1 and 4) and further to form interfitting or locking connections from the upper ends of the lining members, each lug 10 may be provided with a depending boss 38 arranged to engage within a mating perforation 39 through the element 35, this perforation forming a socket for the reception of the boss 38. When the lining member has been placed in position the wire holding the corresponding lug 10 elevated may be removed, whereupon the resilient pressure between the lining member and the band and the proximity of the face of the brake drum prevent disengagement of the lining members and band. By the reverse process, first raising the lug 10 and disengaging the element 35 therefrom, and pulling outwardly thereon, the lining member may be readily slid from its position within the band and removed from the opening 4 of the casing.

With this construction the replacement of the lining for any band may be expeditiously effected without disturbing any of the actuating mechanisms for any of the bands and with a saving of from three to four hours over that required for the usual construction.

Having thus described an embodiment of this invention it should be evident to those skilled in the art that many changes and modifications might be made therein without departing from its spirit or scope as defined by the appended claims.

We claim:

1. A brake band, and a lining for said band comprising removable sections arranged end to end interlocking with the band only at each end.

2. A brake band, and a lining section having pivoted thereto a member slidably engaging said band whereby said section is insertable from positions in planes offset from the plane of said band.

3. A brake band, and a lining section for said band having pivoted thereto at one end a member slidably engaging said band, and the opposite end of said section being constructed to interfit with the end of said band.

4. In combination, a brake band, a lining member for said band, and means pivoted at one end of said member engageable with said band when said member is at an angle to said band and while in such engagement permitting said member to be swung into lengthwise lapping engagement with said band.

5. In combination, a brake band, a lining member for said band, and means at one end of said member engageable with said band when said member is at an angle to said band and while in such engagement permitting said member to be swung into lengthwise lapping engagement with said band, the opposite end of said member and the end of said band being formed to interfit.

6. A brake band, a lining member for said band having a friction face and a resilient back, a channel element shaped to embrace said band swiveled to one end of said back, and an element interfitting with the end of said band at the opposite end of said back.

7. A brake band, and a lining for said band comprising a pair of resilient half sections, each section having a friction face, a guide slidably engaging with said band swiveled to each of the adjacent ends of said sections, and elements at the opposite ends of said sections engageable with the ends of said band.

8. A brake band, and a lining for said band comprising a pair of resilient half sections, each section having a friction face, a guide slidably engaging said band swiveled to each of the adjacent ends of said sections, lug elements fixed to the opposite ends of said band, said sections having elements extending outwardly of said lug elements, and a boss on one of each adjacent band and lining section elements engageable in a socket in the other element for retaining the outer ends of said lining sections in position.

9. In combination, a brake band, a lining member for said band, and pivoted interengaging means between said band and member permitting said band and member to be assembled by a preliminary guided engagement in angular relation and then relatively turning said band and member into lengthwise lapping relation.

10. In combination, a brake band member, a lining member for said band member, and means swivelled to one of said members and slidably engaging the other of said members.

In testimony whereof we have affixed our signatures.

GEORGE W. MacBRIDE.
GEORGE C. BONNEY.